April 5, 1949. W. J. KLAASSEN 2,466,443
APPARATUS FOR PRODUCING FINELY DIVIDED PARTICLES
Filed June 19, 1944 6 Sheets-Sheet 1
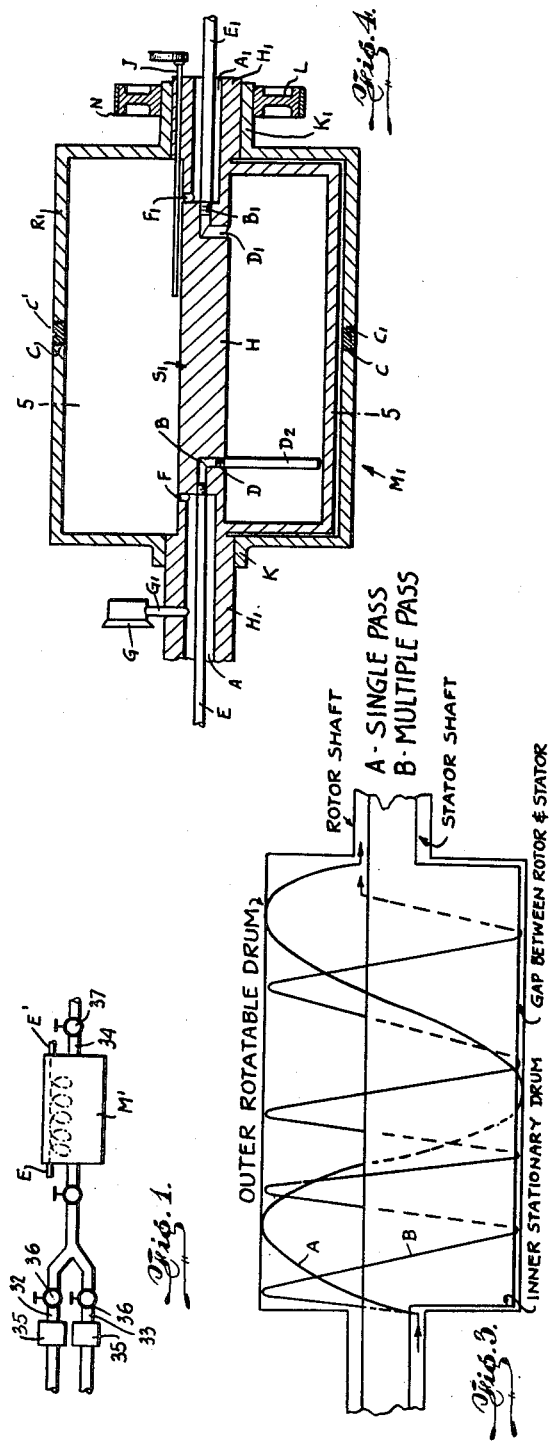
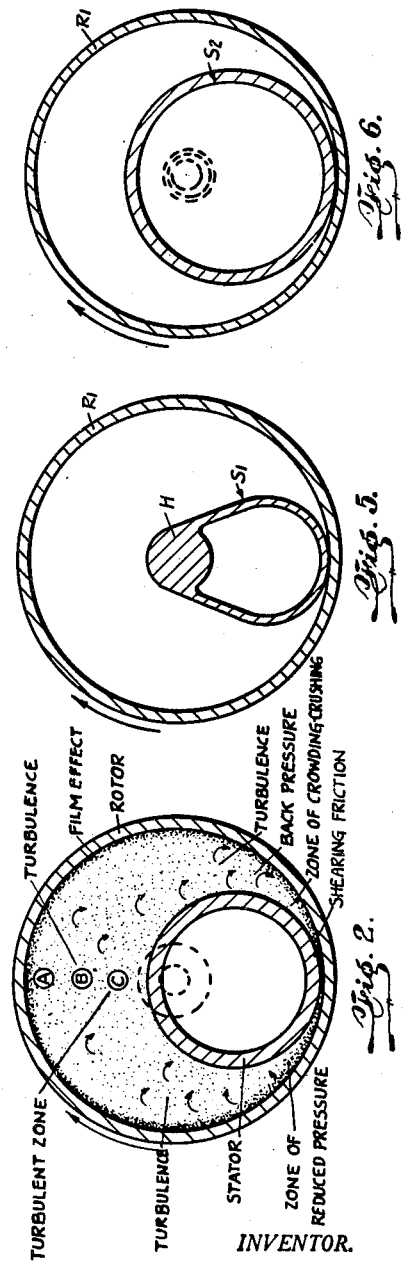
INVENTOR.
WILLEM J. KLAASSEN.
BY
ATTORNEY April 5, 1949. W. J. KLAASSEN 2,466,443
APPARATUS FOR PRODUCING FINELY DIVIDED PARTICLES
Filed June 19, 1944 6 Sheets-Sheet 3
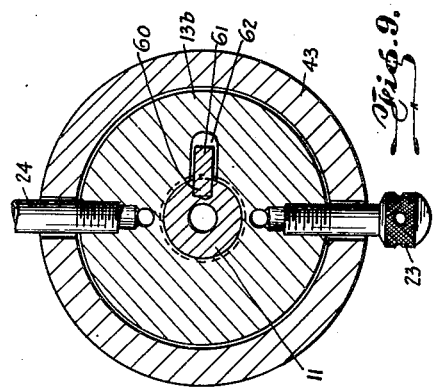
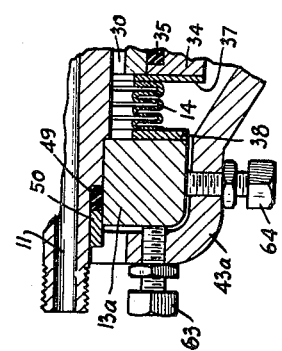
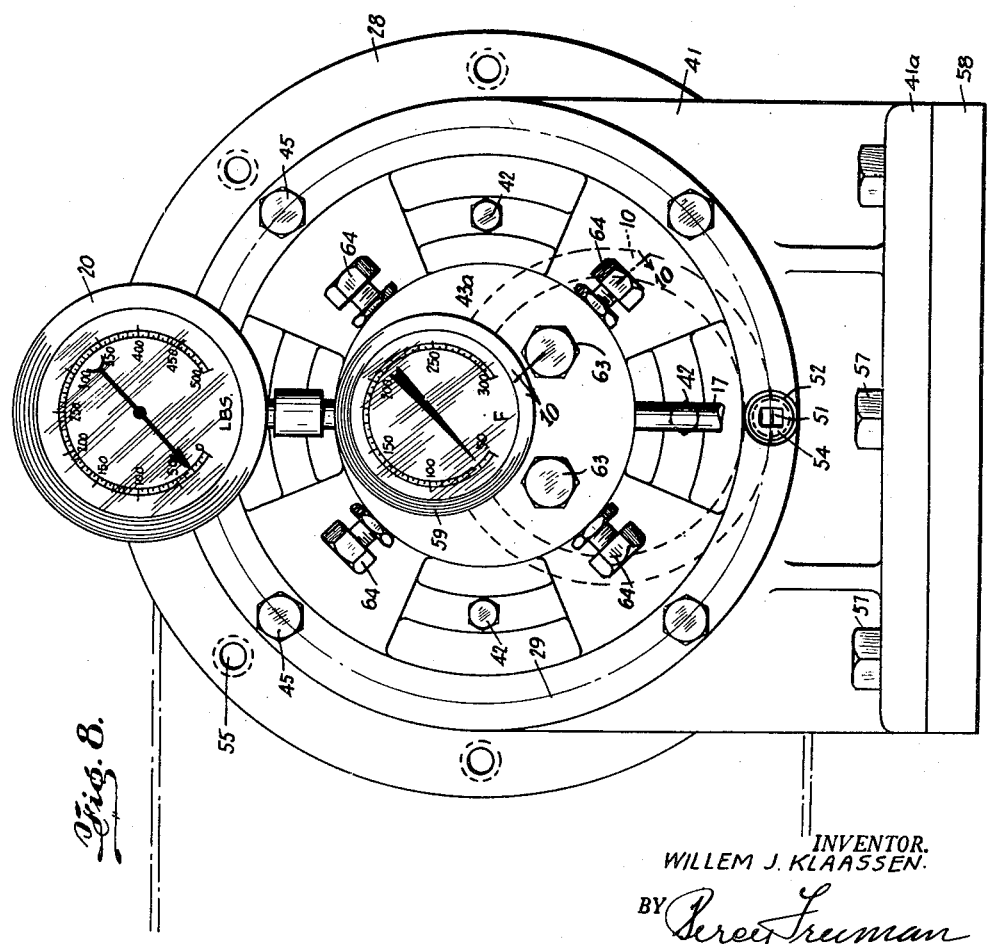
INVENTOR.
WILLEM J. KLAASSEN.
BY Percy Freeman
ATTORNEY.

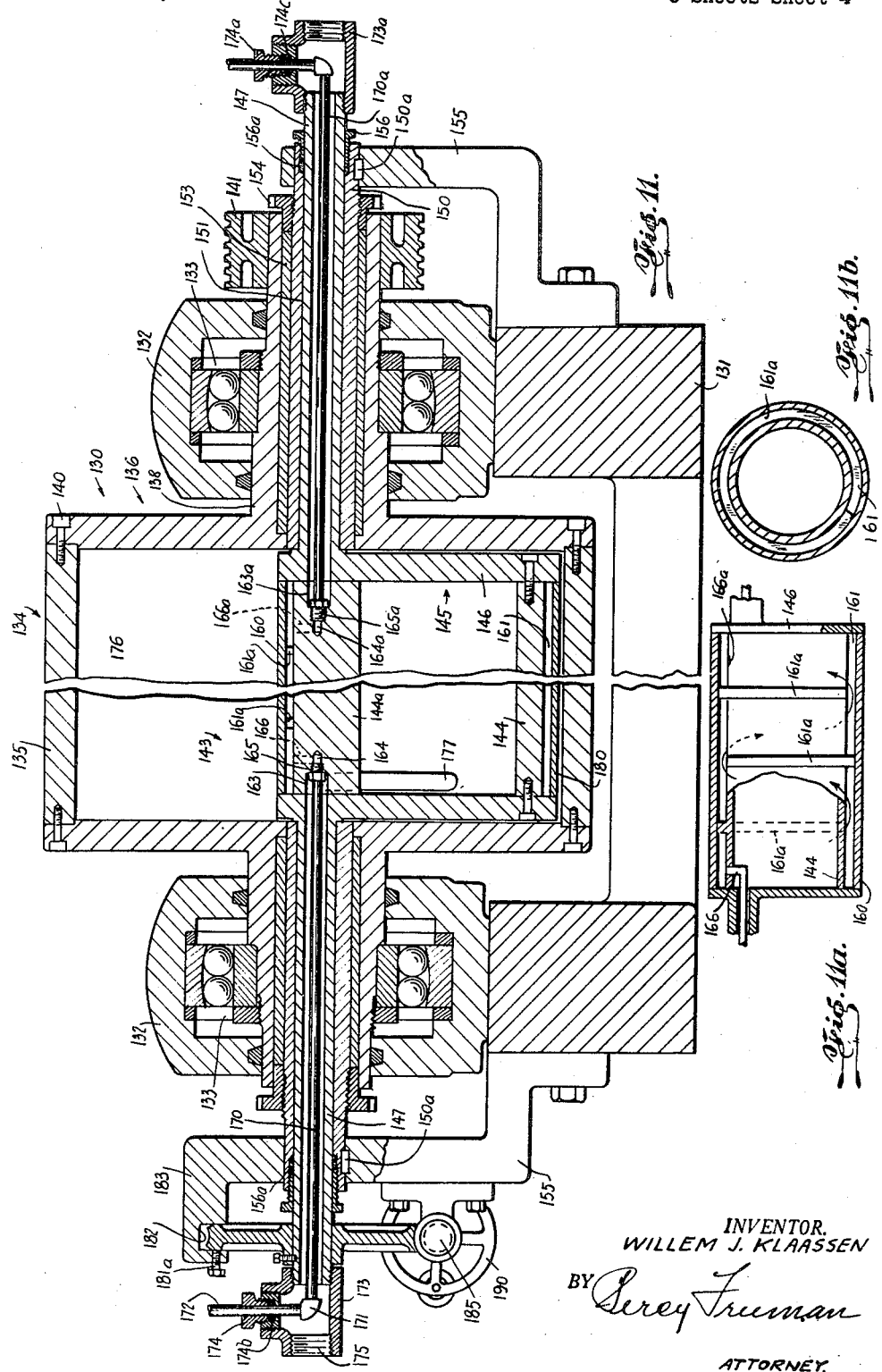

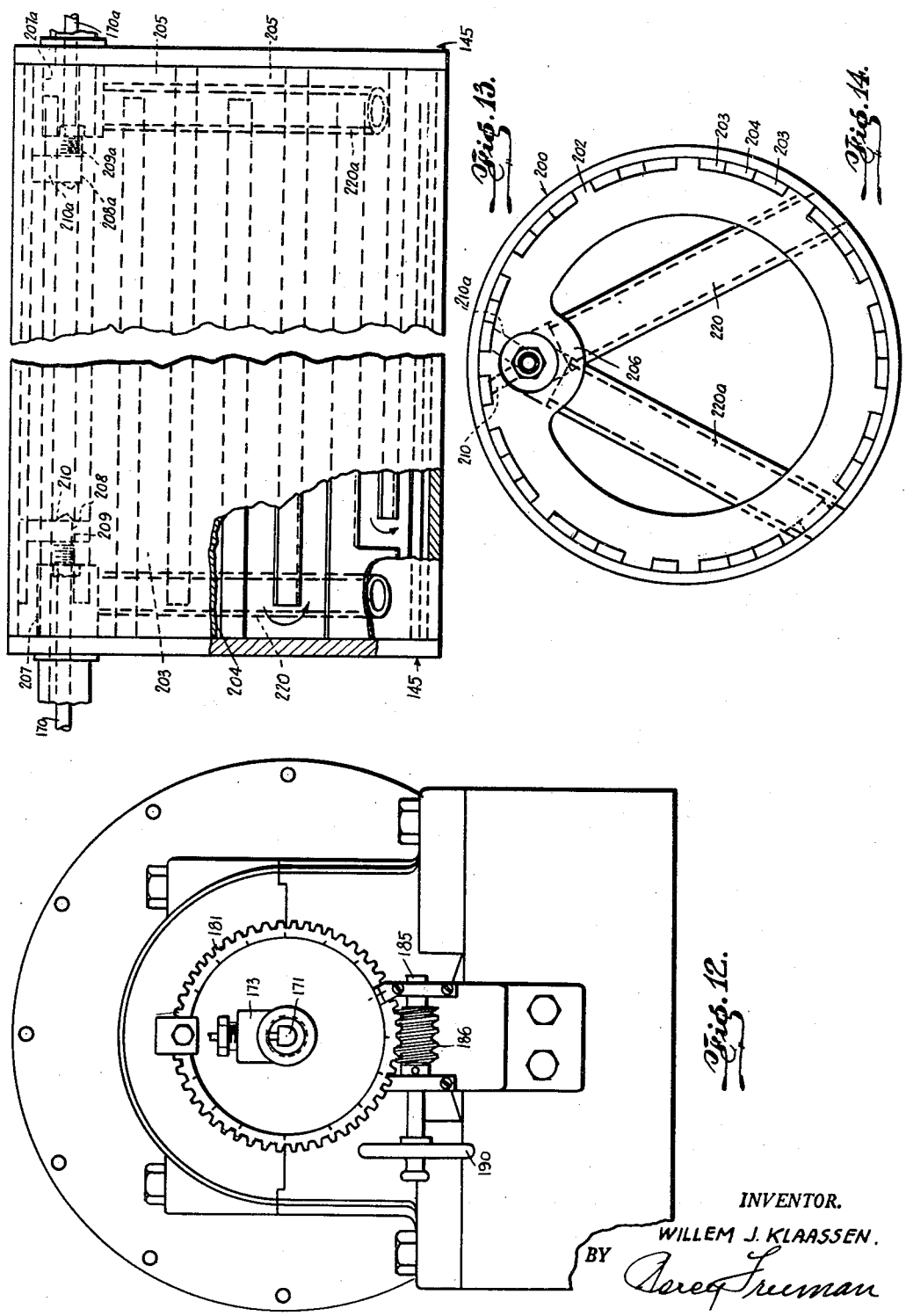

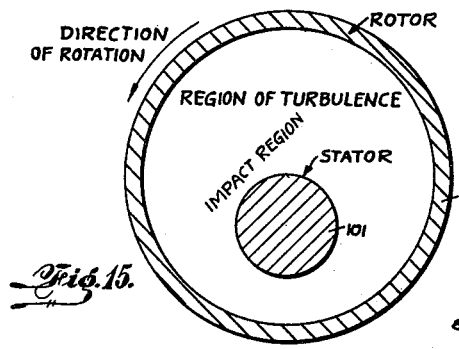
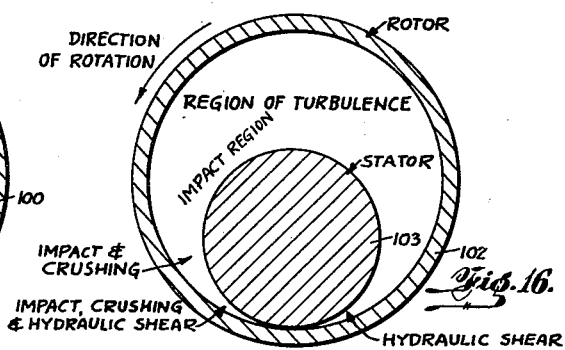
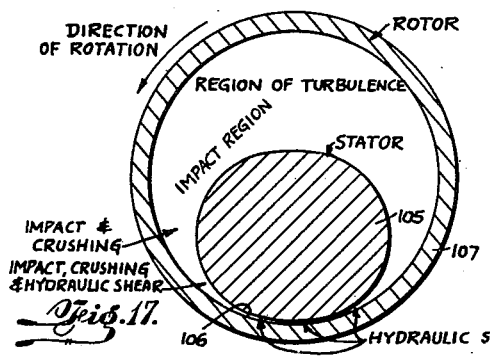
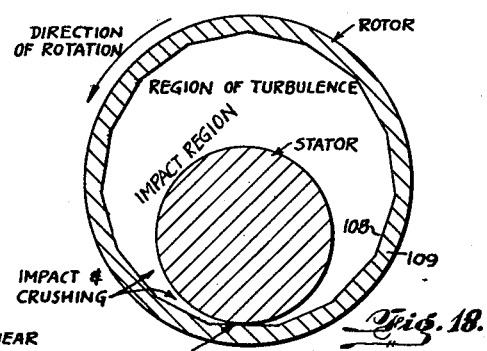
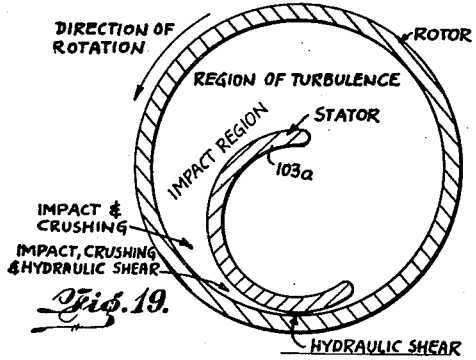
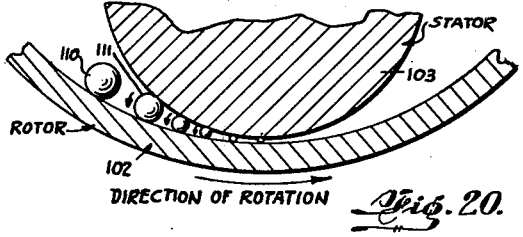
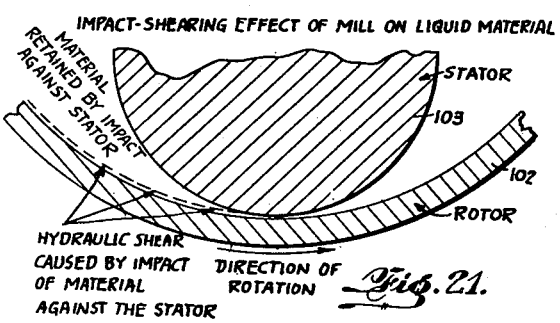

Patented Apr. 5, 1949

2,466,443

UNITED STATES PATENT OFFICE 2,466,443

APPARATUS FOR PRODUCING FINELY DIVIDED PARTICLES

Willem J. Klaassen, New York, N. Y., assignor to Geneva Processes, Inc., Geneva, N. Y., a corporation of New York Application June 19, 1944, Serial No. 541,112

4 Claims. (Cl. 241—66)

The present invention relates to apparatus for producing finely divided particles, their intermixture, and their chemical interaction, and has for its primary object the provision of apparatus and a mode of action for carrying out these operations more rapidly and efficiently than they have heretofore been performed. Reference is made to applicant's prior application, Serial No. 525,315, filed March 6, 1944, now abandoned.

The foregoing and other objects of the invention will be best understood from the following description of exemplifications thereof, reference being had to the accompanying drawings wherein:

Fig. 1 is a diagrammatic view of an interaction system embodying the invention and including conduits, an impeller, and interaction unit as used in a continuous process.

Fig. 2 is a diagrammatic cross-sectional view of a mill embodying the invention with an outer rotor and an inner stator illustrating the principle of the mill when used to process and chemically interact the material within the mill.

Fig. 3 is a diagrammatic view illustrating a single pass (A) and multiple pass (B) of material within the mill, during a continuous process.

Fig. 4 is a more or less diagrammatic cross-sectional view of a mill embodying the invention.

Fig. 5 is a cross-sectional view taken on line 5—5 of Fig. 4.

Fig. 6 is a view similar to Fig. 5 but illustrating a modified construction.

Fig. 8 is an end view of the mill shown in Fig. 7.

Fig. 9 is a cross-sectional view taken on line 9—9 of Fig. 7.

Fig. 10 is a cross-sectional view taken on line 10—10 of Fig. 8.

Fig. 11 is a view similar to Fig. 7 but illustrating still another modified form of the invention.

Fig. 11a is an elevational view of the stator unit illustrated in Fig. 11 with parts broken away and partly in section, to illustrate the baffle ring arrangement in the stator chamber.

Fig. 11b is a cross-sectional view of the stator structure shown in Fig. 11a and showing the opening in the baffle ring.

Fig. 12 is an end view of the structure shown in Fig. 11.

Fig. 13 is a side elevational view of a stator embodied in the invention and illustrating a still further modified form thereof, parts broken away and in section for clarity.

Fig. 14 is an end view of the stator shown in Fig. 13 as viewed from the left with the end plate removed.

Fig. 15 is a cross-sectional view illustrating the simplest form of the operating principle of a dispersion mill embodying the invention.

Fig. 16 is a cross-sectional view of apparatus illustrating one form of the dispersion principle.

Fig. 17 is a view similar to Fig. 16 except that the apparatus of Fig. 17 has an intended region of "pure hydraulic shear."

Fig. 18 is a view similar to Fig. 17 but shows a different form of rotor, illustrating dispersion by pounding.

Fig. 19 is a view similar to Fig. 16 and showing the stator to be a hollow semi-cylindrical member facing the oncoming material.

Figs. 20 and 21 are enlarged, cross-sectional views illustrating the action on the material within the gap between the stators and the rotors shown in Figs. 16 to 19 inclusive.

Figure 7:
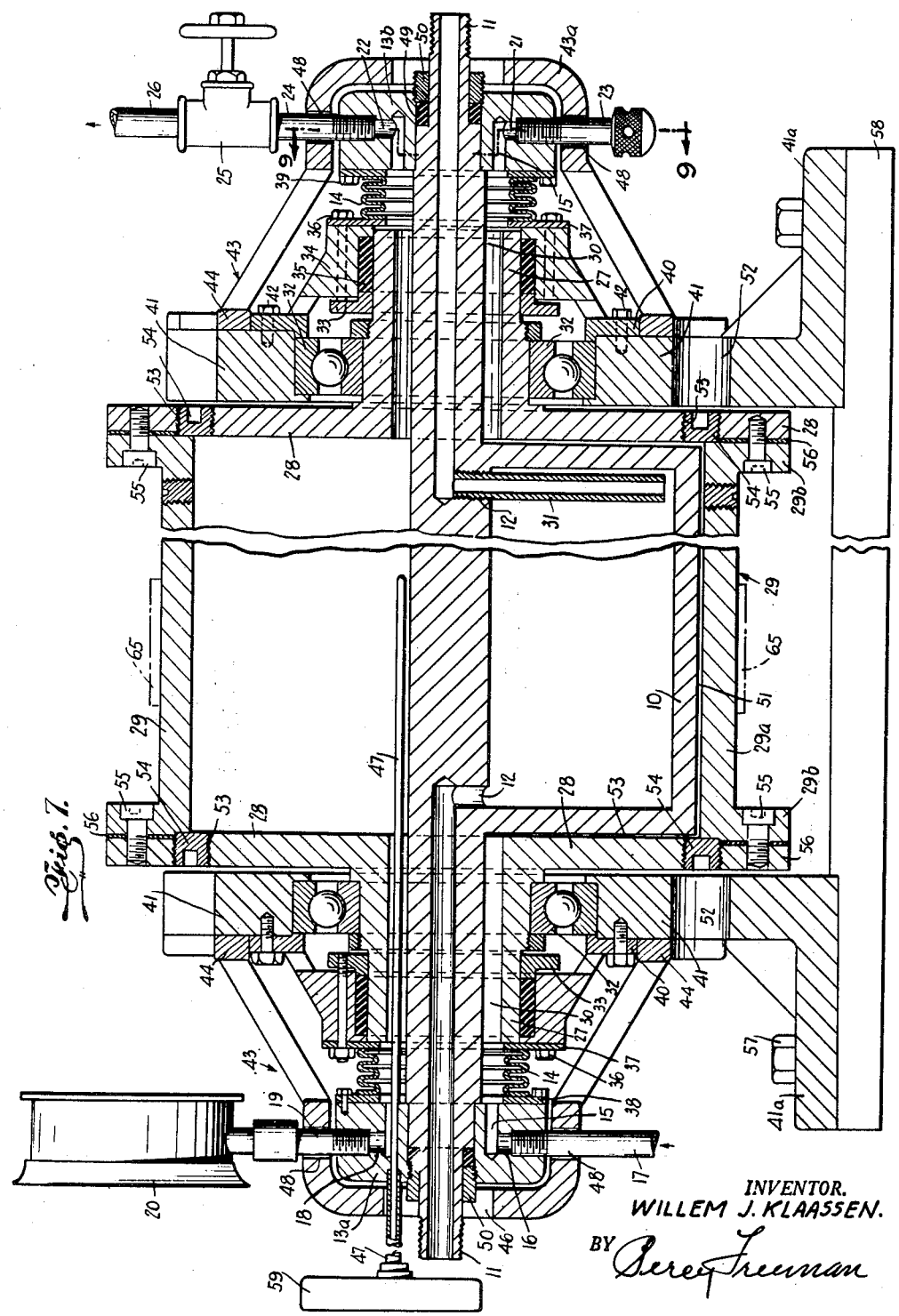
Fig. 7 is an elevational cross-sectional view through a mill embodying the invention and illustrating another form thereof.

The invention relates to apparatus for comminuting or disintegrating relatively coarse particles to sizes approaching the colloidal; to form homogeneous mixtures, dispersions, stable suspensions, or practically so, and emulsions, much more speedily, economically and thoroughly than heretofore; and to promote chemical reactions between ordinarily slowly reacting or practically mutually indifferent substances. The reduction in particle size, dispersion and chemical reaction may be carried out in a single operation. The apparatus can be used merely as a crusher, pulverizer, or, to use a generic expression, disintegrator, which would include the globulization of an oily liquid in a non-oily normally immiscible dispersion medium, and the "atomization" of the globules into extremely fine droplets, by tearing, pounding, bursting or shearing action. Or the apparatus can be used to disperse already finely comminuted matter, or to comminute relatively coarse particles and disperse them.

A feature of the apparatus of the invention is its ability tremendously to promote chemical reaction between normally slowly reactible substances. This may be explained by the fact that the state of extreme subdivision and consequent intimate contact is produced and maintained as long as the material resides in the apparatus.

The resulting increasing states of dispersion of the normally slowly reacting ingredients, will cause the material to react very readily in accordance with the well-known fact that the greater the surface contacts between the reactants, the more rapidly will reaction take place. According to one phase of the invention, the inner stator is made cylindrical and of materially less external diameter than the internal diameter of the drum rotor, and the former is so disposed with respect to the latter as to provide between them a restricted gap or clearance through which the material may be arranged to pass in succession a plurality of times, with the working or shearing portion of the stator confined practically to a line portion and the entire inner wall of the rotor acting as a working surface carrying the material along with it. The arrangement is such that centrifugal action causes the material to cling to the inner surface of the rotor and the continued passes of the material through the narrow region between the working surfaces of both rotor and stator will result in an increased grinding or shearing effect, subdivision and dispersion of the material. The restricted clearance of the narrow region may be of the order of thousandths of an inch and if the difference in diameters of stator and rotor are appreciable, this would provide, especially diametrically opposite the narrow gap, a wide space region many times that of the gap. This wide space region, in cross-section, is crescent-shaped. In operation, as the material in the wide space is forced toward the narrow gap region, the material is more and more subjected to crowding. According to the invention, the speed of rotation is made sufficiently high and the resistance to passage of the material through the gap is made sufficiently great so as to produce an impact effect which is of itself the cause of disruption, dispersion or increased interaction between the ingredients of the material. This impact effect in addition, causes all the material in the rotor to be in a state of intense turbulence, which results in throwing back into dispersion or suspension any material which may have tended to coalesce or settle out, thus further increasing the degree of the resulting dispersion. Furthermore, the continuously narrowing space approaching the gap has the additional effect of crowding the material against the stator thus giving rise to additional grinding, pulverizing, rupturing and shearing action, so that the parts operate at high efficiency.

In Fig. 1, is shown a system, including an interaction unit M' of the invention for subjecting a fluid containing at least two different ingredients to a treatment which effects thorough interaction, such as interdispersion or chemical reactions or a combined interdispersion and chemical reaction between the different ingredients of the fluid. The system may include two conduits 32, 33, through which the two different fluids containing different ingredients are led to the interaction unit M', the resulting interaction product being delivered through an outlet conduit 34.

The two supply conduits 32, 33 are indicated as being provided with impelling means 35 for delivering the fluid with the desired controlled pressure. The interaction unit of the invention is of such character as to combine the mixing as well as the interaction operations and the two fluids with the different ingredients may be supplied directly to the interaction unit M'.

The supply conduits 32, 33 and the outlet conduit 34 may also be provided with valve means 36, 37 to enable ready control of the rate at which fluid enters and leaves the interaction unit, or, in general, the time during which a body of the fluid entering the reaction unit remains therein before it reaches the outlet conduit.

The interaction unit M' is shown provided with means for controlling the temperature of its contents. The temperature control means may be either a refrigerant or a heating fluid of a predetermined desired temperature passed at a predetermined rate through the stator. In general, the several elements of the system are so arranged and designed as to make it possible to supply the fluids to the interaction unit M' at definite rates and to subject the fluids entering the interaction unit M' to the desired interactions at predetermined pressure and temperature conditions for a predetermined length of time, correlated to the particular conditions required for securing the desired interactions, such as interdispersions or chemical reactions between the particular ingredients of the particular specified fluid or fluids.

One embodiment of the apparatus of the invention is illustrated more or less diagrammatically, in Figs. 4 and 5, wherein there is shown a mill $M_1$ in which the outer cylinder $R_1$ is the rotor and which has an inner stator $S_1$. The inner stator may comprise a hub $H_1$ provided with a hollow, offset or eccentric member of any desirable cross-sectional shape but curved at the bottom to produce a small gap between the stator and the rotor.

Means may be provided to introduce a cooling or heating medium into the stator and to withdraw the same therefrom, and also to introduce material into the rotor to occupy the space surrounding the stator and to withdraw said material therefrom. To this end the stator $S_1$ may be formed with axial hubs or trunnions $H_1$ having openings A, $A_1$ at the ends thereof. Extending from the openings A, $A_1$ are similar openings B, $B_1$, part of which are screw-threaded. Extending from the openings B, $B_1$ are openings D, $D_1$, communicating with the interior of the stator, the inlet side of the present instance at D being preferably provided with a pipe $D_2$, extending nearly to the bottom of the stator chamber.

Extending through the openings A, $A_1$ are pipes E, $E_1$ screwed to the threaded openings B, $B_1$. Thus material may enter the stator $S_1$ through pipe E and openings B and $D_2$. The material may be withdrawn from the stator through openings or passages $D_1$, $B_1$, and pipe $E_1$.

The rotor may be provided with screw-threaded openings C for the reception of removable plugs C'. The openings may be utilized for draining of the rotor when desired.

Material may be introduced into the rotor through the opening A and passage F extending therefrom and communicating with the interior of the rotor. Material within the rotor may be withdrawn through a passage $F_1$ in the stator communicating with the opening $A_1$.

The pressure within the rotor may be measured by a pressure gauge G mounted on the pipe $G_1$ communicating with the passage A. The temperature within the rotor may be measured by a thermometer J extending through an opening in one of the hubs $H_1$ and projecting into the rotor.

The rotor is provided with hubs K, $K_1$ rotatably receiving the hubs H, $H_1$. Means is provided to rotate the rotor $R_1$. To this end there is mounted on hub or sleeve $K_1$, a pulley L provided with a belt N leading to a suitable drive.

Figs. 7–10, inclusive, show one practical form of interaction mill of the invention. It comprises a stationary drum 10 depending from and integral with hollow shafts 11, 11, having passages 12, 12, in communication with the interior of the stationary drum. Said shafts 11, 11, are respectively disposed in bearings 13a and 13b, each connected to flexible hollow couplings 14, 14, of the bellows type to the end frame members to be described in detail anon. Both bearings 13a and 13b have annular grooves 15, 15, in their inner walls, in direct alignment and open communication with the flexible couplings 14. Bearing 13a has a passage 16 communicating with the annular groove 15 thereof, into which passage is adapted to be disposed a pipe 17 through which material to be worked upon or processed may be admitted into the apparatus or from which it may be discharged upon the election of the operator. Diametrically opposite passage 16 is a similar passage 18 communicating with said annular groove 15 and adapted to receive pipe 19 connected to pressure gauge 20. Bearing 13b also has passages 21 and 22 (corresponding to passages 16 and 18 in bearing 13a) in communication with its annular groove 16, passage 21 being plugged with a knurled-head screw 23, and passage 22 having a pipe 24 connected to a relief valve 25 from which extends a discharge pipe 26.

The shafts 11, 11, are in substantially coaxial alignment with shafts 27, 27, extending from and integral with the side members 28, of the rotatable drum 29, the internal diameter of shafts 27, being greater than the external diameter of shafts 11, thus leaving annular spaces 30, between the inner and outer shafts. Said annular spaces are in aligned communication with the flexible couplings which are in turn in communication with the annular grooves 15, in bearings 13a and 13b. The outer faces of the side walls of the stationary drum 10 are slightly spaced-apart from the inner faces of the side wall members 28 to avoid friction between said surface though not so slight as to constitute working surfaces which may interfere with the proper operation of the apparatus, such as the generation of unwanted heat.

To the ends of shaft 11, are adapted to be connected suitable means for the introduction and discharge of cooling or heating material and from the inside of the stationary drum. A pipe 31, extending almost to the bottom of the stationary drum, is disposed in one of the openings 12. The pipe is designed so as to function as follows: When a liquid cooling or heating medium is used, it is introduced into the stator chamber via the pipe. The liquid is thus forced to traverse said chamber from top to bottom, thus eliminating the formation of pockets of stagnant liquid; when a condensing heating medium, such as steam, is used, it is introduced through the opening opposite the pipe. As soon as the condensed steam rises to the level of the lower end of the nipple, it will be forced up through the pipe and out through the shaft by the steam pressure behind it.

The hollow shafts 27, of the rotor, are mounted in ball bearings 32, and journaled in bearings 33, inner end frame members 34, and packing glands or rings 35, respectively. Placed flat against the outer faces of the inner end frame members 34, 34, and secured thereto and bearing 33 by means of the screw bolts 36, are flat rings 37, 37, to which are welded or cemented the inner ends of the flexible couplings 14, 14, the outer ends of said couplings being similarly welded or cemented to flat rings 38, 38, engaging the inner flat surfaces of bearings 13a and 13b and connected thereto by screws 39, 39. The inner ends of the inner frame members 34, 34, have annular flanges 40, 40, connected to end plates 41, 41, by means of screws 42, 42, which end plates have each an annular recess in which the ball bearings are disposed. The outer end frame members 43, 43, have annular flanges 44 connected to end plates 41 by screws 45, 45, and the cupped portions 43a of said members 43 have openings 46, 46, through which extend the ends of shafts 11, 11, and a thermometer rod 47. The annular walls of said cupped portions have openings 48, 48, through which pass the pipes 17, 19 and 24 and knurled screw 23 respectively. The outermost portions of the shafts 11 have reduced outer diameters upon which packing glands 49, 49, and locking nuts 50, 50 are mounted.

In order to permit observation and measurement of the gap 51 between rotatable drum 29 and the stationary drum (or rotor and stator), the end plates 41, 41, are provided with openings 52, 52, near the base, while the side members of the rotor are provided with pipe tap openings 53, 53, disposed at suitable points, each equidistant from the center and distanced so as to enable them to be brought into alignment with said gap and the openings 52 in the end plates. In other words, when an opening 53 in the side member is in alignment with an opening 52 then it is possible to observe the clearance, assuming opening 53 to be unobstructed. A feeler gauge (not shown) is employed to accurately measure the clearance. Normally and when the machine is in operation the openings 53 are closed by removable plugs 54, 54. Only when observations are to be made and measurements taken is the appropriate plug removed. Access to the plugs is enabled through the openings 52. The cylindrical body 29a of the rotor has flanges 29b whereby said cylindrical body is connected to the side members 28, screws 55, 55, being used for this purpose. Gaskets 56, 56, of suitable material are disposed between said flanges and said side members to insure a gas- and liquid-tight joint.

The end plates 41 constitute part of the structure for the support of all the other elements, it being integral with a foot portion 41a bolted by means of bolts 57, 57, to a base 58.

In order to prevent rotation of the stator, both shafts 11, 11, of the latter are provided with blind radial bores 60, 60 (Fig. 9) in which are disposed keys 61 disposed in longitudinal grooves 62 in bearings 13a and 13b.

In order to enable the stator to be adjusted relatively to the rotor for the desired clearance, proper alignment and lateral spacing (centering), adjusting screws 63, 63 (Figs. 8 and 10), are threaded in the cupped portions 43a of the outer end frame members 43, are disposed equidistant about the center line of the shafts and preferably equidistant with respect to each other. The inner ends of said screws are brought to bear against the outer faces of bearings 13a—13b. Lateral spacing between the side walls of the rotor and stator can thereby be adjusted as well as the axes of the shafts. To obtain the desired clearance or gap 51, screws 64, 64, are employed. These screws are threaded through the flange portion of cup 43a and are in diametrical alignment. The ends of said screws abut against the annular portion of bearings 13a—13b, and the proper clearance obtained by advancing or retracting said screws. Similarly, lateral adjustment of the drums and axial alignment of the shafts is achieved by advancing and retracting screws 63, 64.

A belt 65 is employed for rotating the outer drum, said belt being connected to the shaft of a motor (not shown). Other means for rotating said drum may, however, be employed.

In order to take off any lateral strain on the ball bearings, one of them may be arranged to be held rigidly in place, while the other is capable of lateral movement or displacement. In the drawings the righthand ball bearing is the laterally movable one.

In the arrangement shown in Figs. 7–10 inclusive, the introduction of the material to be worked on or processed is by a feed pump connected to pipe 17. Pressure is built up to the desired degree, and the processed material is discharged through the relief valve by release of pressure. Pressure conditions are read on the dial of the pressure gauge.

The thermometer rod 47 extends well into the rotatable drum and temperatures are read on the dial 59.

For batch operations material may be directly introduced into the rotatable drum through a suitable hatch.

It is seen, therefore, that the apparatus comprises an outer rotatable drum in which is disposed, in eccentric relationship thereto, a stationary drum. In addition, the parts are so formed and arranged that material may be introduced into the rotatable drum at one end and removed from the other, while a cooling or heating fluid may be introduced into the stationary drum at one end and discharged at the other. Means are also provided for adjusting the stationary drum laterally with respect to the rotatable drum, and means are also provided for adjusting the clearance between the stator and the rotor.

Most processes find the presence of air in the rotatable drum and hence in the ultimate product, undesirable. Accordingly, in the principal field of application for which the apparatus arrangement shown is intended, the rotatable drum is completely filled with the material to be processed, and the air is displaced, so that there is present in the drum only those ingredients which it is desired to work up. Wherever one of the ingredients is a fluid and the material is in contact with the rotating drum, a film of the material will firmly adhere to and be carried along by it. If the stator is not present, the material in contact with this film will be carried along or entrained by the film, and there is a tendency for all the material to be thus entrained, ultimately approximating the speed of rotation of the rotating drum. The stator now, being in the path of the material, will largely break up the rotary motion which the material would otherwise attain. As the material moves from the large space towards the narrow shearing gap, the material becomes more and more crowded, and at the gap only a small amount of the material can pass through and that mainly a thin portion in contact with and close to the inner wall of said rotating drum. The forward momentum of the rest of the material is increasingly checked as it approaches the gap, and if the speed of rotation is great enough the momentum of the material may also be great enough to produce a back pressure toward the entry to the gap, as well as a rebound of said material in this region, which, upon meeting the rearward but oncoming material, creates a kind of turbulent condition which is very effective in causing the disruption and dispersion of the material. In addition to the clash between the rebounding and oncoming masses of material resulting in a state of turbulence, there is shearing friction between said rebounding material and the material hugging the inner wall of said drum. To a certain degree there is also impact between the moving mass of material and the stationary drum acting as an obstruction. By making the speed of rotation of the outer drum sufficiently great, the impact effect may be made sufficiently large so as to impart to the material a disruption and/or dispersion of a large desired magnitude.

An apparatus embodying the subject matter of the present invention can be used for either slow or fast continuous operation or batch operation, as distinguished from the conventional colloid mill which is useful only for continuous processes, since the material goes in at one end and is shot out at the other, and the period of actual residence of any given particle between the working faces of the mill is only a very small fraction of a second.

With the apparatus of the invention, the material may be kept in the mill for any desired period, whether seconds, minutes, hours, or days, while constantly working it. Thus, if it be desired to obtain an emulsion having the degree of dispersion illustrated by the following table, the rotatable drum is merely filled with the required material through any port of entry, whether it be through the hollow shaft of the rotatable drum or otherwise, and the apparatus is run at the indicated speed for the required period of time—in this case an hour.

TABLE

*Operating data*

R. P. M. _____ 2157
Peripheral speed ____ 5645 ft. per min.
Rotor-stator clearance _____ .010″
Cooling _____ Cold water through stator
Volume of charge ___ 100% of capacity of reactor
Average power consumption _____ 12½ K. W.

*Ingredients*

| | Per cent |
|---|---|
| Samson's mineral oil | 49.5 |
| Distilled water | 49.5 |
| Sodium oleate | 1.0 |

*Particle size distribution*

| Experiment number | 1-66 | 1-67 | 1-68 | 1-69 | 1-70 |
|---|---|---|---|---|---|
| Milling time in minutes | 1 | 5 | 15 | 30 | 60 |
| | Per-cent | Per-cent | Per-cent | Per-cent | Per-cent |
| 0–1 microns | 1.0 | 5.0 | 6.0 | 15.0 | 20.0 |
| 1–2 microns | 1.0 | 5.0 | 6.0 | 10.0 | 40.0 |
| 2–3 microns | 3.0 | 15.0 | 13.0 | 25.0 | 36.0 |
| 3–5 microns | 10.0 | 25.0 | 73.0 | 49.35 | 3.7 |
| 5–10 microns | 82.2 | 49.9 | 1.5 | 0.0 | 0.3 |
| 10–20 microns | 2.6 | 0.1 | 0.0 | 0.0 | 0.0 |
| 20–30 microns | 0.1 | 0.0 | 0.1 | 0.05 | 0.0 |
| 30–50 microns | 0.1 | 0.0 | 0.0 | 0.2 | 0.0 |
| 50–100 microns | 0.0 | 0.0 | 0.4 | 0.4 | 0.0 |
| Total Percent | 100.0 | 100.0 | 100.0 | 100.0 | 100.0 |
| Average Particle Size in Microns | 7.1 | 5.2 | 3.8 | 3.2 | 1.9 |
| Final Temperature, Degrees Fahrenheit | 84 | 94 | 103 | 102 | 104 |

This, of course, is an example of a batch operation. Where the same degree of dispersion can be obtained (with other materials) in a fraction of a second or a few seconds, then the process can advantageously be carried out as a continuous one. In this event, the material can be introduced by pump or gravity into the rotatable drum at one end, and caused to describe or take on a generally helical motion and be discharged at the other end. Any given particle of such material (and hence all of the material) may describe a spiral around the stator, as illustrated in Fig. 7. The number of passes of any given material may be dependent upon the speed of rotation, the rate of charge, the width of the rotor-stator clearance, and possibly the viscosity.

According to the invention, interaction arrangement of the type described above is used for carrying out combined colloidal mill interspersion actions as well as chemical reactions. In the field of chemical technology there are many examples of processes calling for the chemical reactions of substances which, under normal conditions of temperature, pressure and activity (or lack of it), react very slowly or practically not at all. An example is the emulsion copolymerization of butadiene and styrene, in the manufacture or production of products such as synthetic rubber. This is true of any two immiscible liquids of unequal specific gravity, which are layered, and which are relatively indifferent to each other under quiescent and normal temperature conditions. Generally, such ordinarily difficulty reactible substances can be made to react or to react more rapidly either by the application of heat or by comminution, preferably a combination of the two where feasible. Reactions, such as the copolymerization of butadiene and styrene, are speeded up very much by increasing the area of contact between the ingredients, i. e., by a thorough comminution of the reactants. Reactors employed for speeding up these reactions generally include means for stirring. However, stirring, no matter how vigorously carried on, never produces a fine dispersion but is merely an expedient for bringing masses of material into some degree of contact with each other. For instance, no amount of stirring can produce such a state of dispersion as is obtained by the apparatus of the invention, as exemplified by the experimental work recorded in the table.

An outstanding feature of the present invention is that the apparatus not only is capable of very rapidly producing high degrees of emulsification or dispersion of premixed materials, but is itself a pre-mixer. Thus in the making of mayonnaise, the eggs, oil and vinegar may be put directly into the rotatable drum without premixing. The common practice at the present time is to introduce these materials into a premixer, which is nothing more than a large vessel with a stirrer, get the stirrer going, and convey the premixed material into a conventional colloid mill, from which the material is emitted as the final product. In the present apparatus, the material is automatically premixed and then dispersed into a homogeneous product.

According to the invention, the interaction arrangement of the type herein described is designed to operate as a colloid-reactor mill which promotes chemical reactions between materials under conditions of very fine dispersion, and exhibits the following characteristics:

They are designed so that the reactants are brought into such a fine state of dispersion that the rate of the reaction is speeded up to the highest possible degree; and that this fine state of dispersion shall be maintained until the desired chemical reaction has gone to completion.

In the present embodiment of my invention employing an outer rotatable drum and an inner stator, the ingredients to be dispersed derive momentum from their friction against the rotating member. They have the highest linear velocity in the immediate vicinity of the rotor, whereas the velocity of the material in immediate contact with the stator is substantially nil. The fact that the material in the immediate vicintiy of the rotor has the highest linear velocity also gives it the greatest centrifugal tendency, i. e., the greatest tendency to move away from the center of rotation.

The fine degree of dispersion obtained in a narrow rotor-stator clearance is maintained in the wide space between the rotor and stator by the state of intense turbulence prevailing there. This turbulence results from the impact of material against the stator.

The interaction arrangements of the invention are designed to exhibit the following characteristics:

1. The material to be dispersed may be passed through the space between rotor and stator not just once, but a great number of times.

2. The time of residence of the material in the reactor should be prolonged so as to allow the reaction to go to completion.

3. The materials to be dispersed should be continuously agitated during their residence in the reactor to prevent settling.

Since different materials may need a different clearance between rotor and stator, the interaction unit should allow of this clearance.

The present apparatus has been designed with these considerations in mind, and is designed to operate in a manner which secures all the conditions just enumerated. Thus the interaction arrangement of the invention is designed to secure the following operating conditions:

1. That in its travel through the reactor the material to be dispersed passes (or is capable of being passed) the clearance between rotor and stator a number of times.

2. That the time of residence of the reactants in the mill can be prolonged as long as necessary for performing the desired reaction results.

3. That the reactants are kept in a state of agitation during the period of residence in the mill.

In designing a colloidal-mill reactor arrangement, the following are taken into consideration. The rate at which a chemical reaction takes place is dependent upon:

1. The nature of the chemical reaction.
2. The mode of aggregation of the reactants.
3. The concentration of each of the reactants.
4. The temperature of the reactants.
5. The pressure on the reactants.
6. The degree of dispersion of the reactants.

Assuming the first five of these factors fixed, the degree of dispersion becomes of great importance in determining the rate of the chemical reaction, and hence the desirability of obtaining as high a degree of dispersion as possible. In the case of immiscible substances the contact surfaces between the different phases are the only places where the chemical reaction can take place and, other factors being equal, the rate of the reaction will be roughly proportional to the magnitude of the contact area. Consequently, a chemical reaction will proceed more rapidly as the contact area between the reactants is increased, i. e., when a higher degree of dispersion is obtained.

The temperature of the material is controlled by passing a cooling or heating medium through the body of the stator. The whirling motion of the material in the reactor makes for a high coefficient of heat transfer. The end faces of the rotor and stator should not be so close together that a small deformation of these members would cause them to touch, nor so far apart that the effective length of the stator is unnecessarily reduced.

The apparatus of the invention has the following distinguishing characteristics:

1. It is its own premixer.
2. It has a very large pre-grinding zone; one-half of its internal volume can be considered a pre-grinding zone, which is that half in which the distance between rotor and stator decreases continuously relative to direction of flow. This corresponds to a "lead" whose dimensions vary from many inches to the size of the rotor-stator clearance. This feature makes it possible to disperse very large objects, for instance, whole fruits, directly in the apparatus. For this purpose rough grinding faces are required.
3. Long residence, with consequent assurance of multiple passes, as shown at B in Fig. 3.
4. The particle size can be very accurately controlled by regulating (a) the relative speed of the rotating drum, (b) the clearance setting, and (c) the time of residence. An ordinary colloid mill very often does not give a finer particle size when run at a higher speed, because then the material is in the rotor-stator clearance a correspondingly shorter length of time.
5. It is capable of dealing with a gas immiscible in one or more liquids, and one or more solid materials, either for the purpose of producing a physical dispersion or to effect or promote a chemical reaction therebetween.
6. It is capable of disintegrating or comminuting solid material regardless of the amount of liquid present.
7. Generally the particle size obtainable from the apparatus, particularly when used as a colloid-reactor mill, is smaller than that produced by the conventional colloid mill.

The results obtainable in a continuous run are comparable to those in a batch run if the time of residence in the two cases is the same. The preparation of Buna S by the copolymerization of butadiene and styrene is an example of a process suitable for batch operation.

When processing crystalline materials, the grinding faces of the rotor and stator may be coated with Stellite. When dealing with fibrous materials, the grinding faces may be made of Carborundum.

Slight rises in temperature are not generally harmful where the material is not volatile or subject to decomposition at those temperatures. In many cases, it is essential to keep temperatures very low, as in the homogenization of whole egg in order to prevent bacterial growth. In this case, the temperature of the material can be controlled by the passage of any cooling fluid through the stator, e. g., by direct ammonia refrigeration.

In the preparation of solid-liquid dispersions, Carborundum or any rough grinding faces may be employed.

The apparatus of the invention is also suitable for treating gas-liquid mixtures.

The mill arrangement of the invention is designed to produce dispersion by impact, by placing a fixed obstacle in the path of a rotating body of material.

In the dispersion mill of the invention, the rotating motion of the material is caused by placing the material in a rotating container, and the rotating container is referred to as the "rotor," while the fixed obstacle is referred to as the "stator."

A diagrammatic cross-sectional view of a form of apparatus that illustrates the above-mentioned "simplest form" of the operating principle of the dispersion mill is shown in Fig. 15, wherein the rotor 100 has been given the form of a cylindrical shell and the stator 101 has been given the form of a solid cylinder.

If the stator were absent, the adhesion of the material to the rotor would give the material a rotary motion. If the stator is now placed in the path which the material would take if the stator were absent, the result is an impact of the material against the stator, causing a dispersion of the material present between the rotor and stator. In addition, the impact of the material against the stator causes all the material between the rotor and stator to be in a state of turbulence.

The above mode of dispersion can be successfully applied in the following cases:

I. The emulsification of two immiscible liquids.
II. The dispersion of a gas in a liquid.
III. The mixing of dry powders.
IV. The mixing of a solid and a liquid material.
V. The mixing of a solid material, a liquid material and a gas.

By placing the stator in close proximity to the rotor, the principle of "dispersion by impact" can be combined with the principles of "dispersion by crushing" and "dispersion by hydraulic shear," the latter principle being that upon which the operation of colloid mills is based.

Fig. 16 represents a cross-sectional view of an apparatus in which the above dispersion principles may be combined. In this figure the rotor has been given the form of a cylindrical shell 102, the stator that of a solid cylinder 103. The axes of this rotor and stator may be parallel.

If the working region between the rotor and stator is filled with solid material only, the lumps of solid material will be crushed in the narrowing gap between the rotor and stator. For this particular application the working faces should be hard and rough.

If a liquid is present along with the solid materials, the lumps of solid material will be subject to the same crushing action as if the liquid were not present. In addition, however, the solid particles will be subjected to the hydraulic shearing forces set up in the narrow part of the gap between the rotor and stator.

If the apparatus is used for the emulsification of two immiscible liquids, the liquid material in the narrow gap between the rotor and stator will be subject to a combination of impact and hydraulic shearing forces. Only the narrowest part of the gap may be said to be a region of "pure hydraulic shear."

The apparatus presented in Fig. 16 can be successfully used for the following purposes:

I. The emulsification of two immiscible liquids.
II. The dispersion of a gas in a liquid.
III. The dispersion of a solid material in a liquid.
IV. The dispersion of a combination of a solid, a liquid and a gas.
V. The pulverization of a solid material.

The apparatus presented in Fig. 17 is identical with that in Fig. 15 except that the apparatus in Fig. 17 has an extended region of "pure hydraulic shear." Stator 105 has a curve 106 at the bottom, concentric with and spaced from the inner surface of rotor 107.

In the type of dispersion mill presented in Fig. 18, the crushing zone extends through all of the narrow gap between the rotor and stator. This effect is obtained by giving the inner, lateral surface 108 of the rotor 109 the form of a regular prism. Consequently the width of the gap at any one point changes continuously, thus subjecting the material in the gap to a pounding effect, in addition to the other effects already mentioned. This pounding will have a "crushing" effect on solid material and a "squeezing" effect on liquid material.

The number of sides of the regular prism should be sufficiently large so as to prevent the formation of "pockets" of material at the edges of the prism. For the same reason it may be desirable to have these edges rounded.

Only about one-half of the surface of the stator is active in causing dispersion, viz. that half "facing" the oncoming material. Consequently the stator may be designed as shown in Fig. 19 without losing any of its effectiveness. In Fig. 19, stator 103a is in the shape of a semi-cylinder facing the oncoming material.

The shape of the rotor-stator gap shown in Fig. 16 will be discussed in detail.

The cross section of this gap is shown in an enlarged form in Figs. 20 and 21. This cross section may be said to consist of two curves of unequal curvature, curving in the same direction, the curve of the greater curvature belonging to the stator, the curve of the smaller curvature belonging to the rotor, the curves being converging to a point where the gap has its minimum width and being diverging beyond this point of minimum width.

Under the above definition, a cross section consisting of two circles of unequal radii is a special case.

The pulverizing effect of such a rotor-stator arrangement on solid particles is diagrammatically shown in Fig. 20.

The fact that in the dispersion mill the material is "contained in the rotor," gives the material a tendency to rotate with the rotor. The centrifugal tendency to which the material is thus subjected, presses the material firmly against the inside of the rotor. An example of a particle that is firmly pressed against the rotor in this manner is marked "110" in Fig. 20. Such a particle will tend to participate in the rotation of the rotor and will eventually be jammed between the rotor and stator, either directly or through the medium of other solid particles. An example of a particle jammed directly between the rotor and stator is marked "111." Such a particle will then be forced to roll its way into the gradually narrowing clearance and, therefore, cannot escape being crushed. This principle of "compulsory crushing" prevents any "straining out" in cases where a mixture of a solid and a liquid material is present.

Whenever any pulverizing of solid material is to be done in the dispersion mill, its working faces should be rough so as to insure a firm grip on the lumps of solid material.

The emulsifying effect of the gap on immiscible liquids is shown in Fig. 21.

The fact that the gap is gradually narrowing means that not all of the "oncoming" liquid can pass through the narrowest part of the gap at any one time. Part of the "oncoming" liquid is retained by the stator. Only that part of the liquid in immediate contact with the rotor will be pulled through the gap because of its adhesion to the rotor. The liquid retained by impact against the stator is thus "crowding" the liquid that is being pulled through the gap. The result is a hydraulic shearing effect set up between the rotor and the material retained by the stator. The effect of this "indirect hydraulic shearing" is the same as that in a colloid mill set at an extremely fine clearance.

"The combined principles of "dispersion by impact" and "dispersion by indirect hydraulic shear" are peculiar to the rotor-stator arrangement under discussion. The application of these principles in the dispersion mill permits the preparation of very fine emulsions at relatively wide clearance settings and low rotor speeds.

In cases where a solid material is to be dispersed in a liquid, the solid material will naturally be subjected to the above-mentioned hydraulic shearing forces.

The dispersion and reactance mill, based on the aforementioned operating principles, may have the following design features, as will appear hereafter:

I. Means for measuring the temperature of the material.

II. Means for controlling the temperature of the material. The means for cooling and heating can be built into the stator, so that the heat transfer takes place through the stator wall.

III. Means for adjusting the clearance between the rotor and stator.

IV. Means for closing the working region between the rotor and stator, except for a material inlet and outlet.

V. Means for driving the rotor.

In the dispersion mill the "container" is the rotating element, so that all the material undergoes the effect of the impact against the stator all the time. Consequently every part of the material in the mill is in a state of intense turbulence.

In the case of two immiscible liquids the dispersion mill will, therefore, give a very intimate mixture. In the case of a liquid and a gas, the dispersion mill will disperse the gas very finely into the liquid.

For the comminution of solid material, the dispersion mill may take the place of the ball mill.

The dispersion mill is designed as a high speed machine. Consequently, the dispersion mill will grind a batch of material to a certain particle size in a much shorter time than a ball mill will.

The design of the dispersion mill provides for "compulsory subjection of the material to impact against the stator." "Dispersion by hydraulic shear" is optional and can be had in addition to the "dispersion by impact" by placing the stator sufficiently close to the rotor. Even then the region of hydraulic shear is only a small portion of the total working region between the rotor and stator. The rotor does not closely surround the stator and the working region between the rotor and stator can be made to approximate the whole internal volume of the rotor. This is especially apparent in the design presented in Fig. 19.

A dispersion mill never needs a premixer. In a conventional colloid mill the ingredients entering the rotor-stator clearance should be extremely well premixed in order to insure that these ingredients are present in the clearance at the same time and in the proper proportions. If these ingredients are not well premixed, a small quantity of one of these ingredients may temporarily occupy all or almost all of the rotor-stator clearance and will, therefore, find none or too little of the other ingredients to form a dispersion with.

When a dispersion mill of the invention is used in a continuous process, the ingredients can be fed into the mill in a completely unmixed state. The streams fed into the mill are so small in comparison to the size of the working region between the rotor and stator that at all times the ingredients will be present in this working region in the proper proportions.

When a conventional colloid mill is used for dispersing a batch of material, a common procedure is to premix the ingredients in a premixing tank and then to pump the premix through the colloid mill. A dispersion mill, when used as a batch machine, may serve as its own premixing tank. The ingredients are simply placed into the "rotor" and the milling is continued until the required degree of dispersion has been obtained.

A dispersion mill is an internal recirculation machine. Sometimes repeated passes through a conventional colloid mill are necessary to obtain the required degree of dispersion. For this purpose the conventional colloid mill is usually provided with a large funnel, capable of holding the entire batch of material. From this funnel the material feeds into the rotor-stator clearance. By means of a pump or by means of the pressure exerted by the mill, the material is pumped back into the funnel.

In a dispersion mill of the invention, the working region between the rotor and stator may hold the entire batch of material. The longer this material is milled, the greater will be the average number of times that each part of the material passes through the rotor-stator clearance. A dispersion mill will, therefore, subject that material to any number of milling passes without the use of a pump or outside piping.

For a given dispersion mill of the invention, running at a given speed and set at a given clearance, the average number of "milling passes" is ultimately a function of the time of residence of the material in the mill. In a continuous process the average number of milling passes is, therefore, a function of the feed rate. In Fig. 3, there is illustrated single pass and multiple passes in the mill.

The dispersion mill permits excellent temperature control. The fact that in the dispersion mill of the invention a large body of material is present in the working region, makes it very convenient to measure and control the temperature of this material accurately. The high degree of turbulence makes for a high coefficient of heat transfer. The interior of the stator can be made to accommodate any heating or cooling agent.

In conventional colloid mills it is difficult to measure the temperature of the material in the rotor-stator clearance. Once the material has left the clearance the state of turbulence no longer exists and thus the transfer of heat is impeded considerably.

Its particular rotor-stator arrangement gives the dispersion mill the following additional advantages over the colloid mill. In the dispersion mill the solid material will not strain out. It is seen from Fig. 20 that in the dispersion mill the rotor simply "rolls" the solid particles into the rotor-stator gap so as to provide compulsory crushing of this material.

The essential features which make for this compulsory crushing of solid material in the dispersion mill are:

A. The rotor moves in the direction in which the material is to traverse the rotor-stator clearance.

B. The fact that the rotor is the outer member insures a firm grip of the rotor on the solid material by centrifugal force.

C. In the clearance gap the stator approaches the rotor so gradually that the forward, rolling motion of the solid particles is not interfered with.

The feature of "compulsory crushing" in the dispersion mill thus effectively eliminates any possibility for solid material to strain out from the liquid in the approaches to the narrowest part of the rotor-stator gap.

The straining out of solid material in the approaches to the rotor-stator clearance of a colloid mill is not an infrequent phenomenon, even though gravity, liquid pressure and centrifugal and attritional effects tend to lessen its occurrence.

The liquid dispersion mill does not have to be a precision instrument. In general a conventional colloid mill must be set at an extremely fine rotor-stator clearance to produce an emulsion of a fine particle size. Consequently, the rotor and stator faces must be held to a very close tolerance to make such a fine clearance setting possible. The colloid mill, is, therefore, a precision instrument.

Experiments show that a dispersion mill does not have to be set at a fine rotor-stator clearance to produce an emulsion of a fine particle size. The particle size of the resulting emulsion hardly varied when the rotor-stator clearance was changed from .003" to .030".

Consequently, the rotor and stator faces of the liquid dispersion mill do not have to be held within close tolerances; in other words, the liquid dispersion mill does not have to be a precision instrument.

A liquid dispersion mill does not need a clearance adjustment. In a colloid mill the particle size of the resulting emulsion usually varies widely with a change in the rotor-stator clearance. It is, therefore, in general necessary to provide a colloid mill with a clearance adjustment. This clearance adjustment is also used to compensate for any wear of the rotor-stator faces.

Experiments show that in the case of a dispersion mill the particle size of the resulting emulsion is, within limits, virtually independent of the width of the rotor-stator clearance. A change of .027" (from .003" to .030") hardly affects the particle size of the emulsion. This figure of .027" is far higher than the amount by which the rotor and stator faces will jointly wear off during the life of a liquid dispersion mill. From the standpoint of wear such a mill does, therefore, not need a clearance adjustment.

In a liquid dispersion mill the particle size of the emulsion can be most effectively controlled by regulating the speed of the mill, the time of residence of the material, or both. In a continuous process the time of residence of the material in the mill is controlled by regulating the feed rate; in a batch process by regulating the milling time.

In a liquid dispersion mill, a clearance adjustment is, therefore, entirely superfluous. Such a mill can be provided with a fixed rotor-stator clearance of, for instance, .010".

Because of the fact that the dispersion mill can be filled to capacity with the material to be dispersed, it has the following advantage over the colloid mill:

The dispersion mill does not incorporate any air in the product. In most colloid mills the presence of air in the interior of the machine cannot be avoided. Part of this air is usually incorporated in the product.

The dispersion mill constitutes a completely closed system, except for a relatively narrow inlet and outlet. The interior of the mill can be completely filled with material, thus expelling any air. The material is, therefore, dispersed in the complete absence of air. The material leaves the mill through a piping system and thus it does not come in contact with any air until discharged from this piping system in a relatively slow stream. The product will, therefore, contain no air whatsoever.

The fact that the dispersion mill constitutes a closed system, gives it the following advantage over some types of colloid mill:

The dispersion mill can be run under pressure. The dispersion mill is equipped with deep stuffing boxes which may be hydraulically balanced. Consequently, the dispersion mill can be used for materials whose vapor pressure exceeds one atmosphere at the operating temperature, like gases liquefied under pressure. The dispersion mill will also "take" any pump pressure, so that a pump placed "before" the mill can be used to pump the dispersed products to a point anywhere "after" the mill.

In Figs. 11 and 12, there is shown a dispersion and reactance mill 130 illustrating still another modified form of the invention. The mill 130 comprises a support or frame 131 on which there is mounted a pair of spaced pillow blocks 132 carrying ball bearings 133. Supported by the ball bearings 133 is a rotor, 134. Said rotor comprises a cylindrical member 135 to the ends of which are attached end members 136. Each end member 136 comprises a flat wall 137 contacting an end edge of cylinder 135, and an axial outwardly extending trunnion 138, passing through the inner race of the bearing 133. Walls 137 may be attached to the cylinder 135 by means of screws 140, or in any other suitable manner.

On one of the trunnions 138 is a pulley 141 which may be belted to a motor for rotating the rotor.

Within the rotor 134 is a stator 143. Said stator may comprise a cylinder 144, to opposite sides of which are attached end members 145, each of which comprises a flat circular wall 146 and a horizontal, outwardly extending sleeve 147 passing through one of the trunnions 138. Cylinder 144 has an enlarged or thickened boss 144a at its upper side. The sleeves 147 are eccentric with respect to the end walls 146. Cylinder 144 is concentric with end walls 146. The thickened boss 144a is substantially in alignment with the sleeves 147.

Interposed between sleeves 147 and trunnions 138 are sleeves 150, each formed with an eccentric bore or through opening 151. Surrounding sleeve 150 and interposed between said sleeve and the inner surface of trunnions 138 is packing 153. Screwed to each of sleeves 150 is a packing gland 154 to compress the packing.

Fixed to the opposite sides of frame 131 are brackets 155 formed with openings through which sleeves 150 pass. The sleeves 150 are secured against rotation by keys 150a in registering keyways in the sleeves and brackets. At the outer ends of sleeves 150 are packing glands 156 to compress packing 156a to prevent leakage between sleeve 147 and sleeves 150.

Surrounding cylinder 144 is a second cylinder 160 spaced from the inner cylinder and contacting at the ends thereof, the inner surface of end walls 146. A chamber 161 is thus formed between cylinders 144 and 160.

Means is provided to supply a heating or cooling medium to chamber 161 and to withdraw the medium from said chamber. To this end the enlarged portion 144a of the inner cylinder 144 is formed at one end with a recess or opening 163 from which there extends a smaller opening 164, part of which is formed with screw threads as at 165. Extending from opening 164 radially outwardly is an opening 166 communicating with chamber 161.

At the opposite end of inner cylinder 144 is an opening 163a from which there extends a smaller opening 164a, part of which is formed with screw threads as at 165a. Extending from opening 164a radially outwardly is an opening 166a similar to the opening 166, described previously and likewise communicating with chamber 161.

To insure circulation of any cooling or heating medium in the chamber 161 and avoid stagnation therein, the chamber may be provided with annular baffle rings or partitions 161a between cylinders 144 and 160, Figs. 11a and 11b the alternate partitions 161a having an opening at the bottom and the intermediate partition having an opening at the top, thus causing the medium to take a circuitous path from inlet 166 to outlet 166a.

Extending through one of the sleeves 147 is a pipe 170 engaged with the screw-threads 165. At one end of pipe 170 is an elbow fitting 171 to which there is attached a pipe 172 extending at right angles to pipe 170. To the outer end of said sleeve 147 is secured a T fitting 173 provided with a gland 174 to compress packing 174b and through which pipe 172 passes. The opening 175 of said T fitting may be attached to a source of supply of material to be introduced into the chamber 176 between the rotor and stator of the mill.

A tube 177 communicating with opening 163 extends through the two cylinders 144 and 160 of the stator, thus establishing communication between opening 163 and chamber 176 inside the rotor.

It will be noted that openings 163 and 163a register with the interior of the respective sleeves 147. Thus material to be introduced into the mill will pass through the T fitting 173, through the sleeve 147, opening 163, and tube 177, to chamber 176. Pipe 170 is of smaller diameter than the interior of sleeve 147 so as to provide ample passage for introducing material into the mill.

The material within the mill may be withdrawn therefrom through passage 163a which also has a conduit connection to the interior of the mill similar to passage 177 but radially offset with respect thereto.

Opening 163a also communicates with the interior of the other sleeve 147 to which there is also connected a T fitting 173a similar to a T fitting 173. Extending through said other sleeve 147 is a pipe 170a engaged with screw threads 165a and likewise passing through a gland 174a in T fitting 173a, the gland compressing packing 174c.

It will now be understood that the material within the mill may be withdrawn therefrom through the other sleeve 147 and T fitting 173a.

The cooling or heating medium may be introduced into the stator through pipes 172 and 170 and openings 164 and 166.

The same may be withdrawn from the stator through openings 166a, 164a, and pipe 170a.

Means is provided to vary the gap 180 between the lower end of the stator and the adjacent portion of the rotor. To this end is fixed to one of the sleeves 147 as by means of a set screw 147a, a worm gear 181, the upper portion of which moves through a slot 182 on an extension 183 of bracket 155. Mounted on bracket 155 in any suitable manner is a worm shaft 185 carrying a worm 186 meshing with the worm gear 181.

On shaft 185 is a handle or wheel 190. Upon rotating the wheel 190 worm 186 rotates the worm gear 181 causing rotation of the stator. Since the sleeves 147 are eccentrically mounted with respect to the outside of the sleeves 150, and hence to the rotor trunnions 138, rotation of the stator will vary the gap 180 between rotor and stator. A set screw 181a may be provided to effectively secure the worm gear 181 against rotation after the rotor-stator clearance has been set to the desired width.

In Figs. 13 and 14, there is shown a modified stator construction wherein the stator 200 is shown as comprising an outer cylinder 201 and an inner cylinder 202 telescoped therein and fixed thereto as by friction fit, welding or in any desired manner. At the outer surface of the inner cylinder 202 are longitudinally milled slots 203. One pair of adjacent slots 203 are interconnected at one end by a milled slot 204, and each of said slots 203 is interconnected to the next adjacent slot 203 by an end slot 205 at the opposite end of the cylinder. There is thus produced on the outer surface of cylinder 202 a serpentine passage extending back and forth throughout and around the entire outer surface. The beginning of said passage is preferably at one end of the cylinder, and the end of the passage is preferably at the opposite end of the cylinder.

The inner cylinder 202 has an enlarged longitudinal boss 206 formed at one end with an enlarged recess or hole 207. Extending from the enlarged hole 207 is a smaller hole 208 formed with screw threads 209. Extending from opening 208 is an opening 210 extending to the beginning of the serpentine passage. At the opposite end of boss 206 is a similar recess or enlarged opening 207a and extending therefrom is a smaller opening 208a formed with screw threads 209a. Extending from opening 208a is a passage 210a communicating with the end of the serpentine passage on the outer surface of cylinder 202.

Attached to the ends of cylinders 201, 202 are stator end members 145 such as shown in Fig. 11. Screwed to openings 209 and 209a are pipes 170 and 170a similar to those shown in Fig. 11.

It will now be understood that the heating or cooling medium may be introduced through pipe 170 to the serpentine passage 203, 204, 205 and withdrawn therefrom through pipe 170a.

Incorporated into one end of the stator is an inclined tube 220 communicating with opening 207 and extending through cylinders 202, 201, thus extending to the outer surface of the outer cylinder 201.

The material to be introduced into the mill thus passes into the sleeve 147 of one stator member 145 to passageway 177 in Fig. 11, or tube 220, into the interior of the mill.

At the other end of the cylinder, as seen in Figs. 13 and 14, is a tube 220a radially offset relative to tube 220, and communicating with opening 207a and likewise passing through the cylinders and extending to the outer surface of the outer cylinder 201. The material within the mill may thus be withdrawn through pipe 220a, opening 207a, and the opposite stator member 145.

It will thus be seen that there are provided means and methods in which the several objects of this invention are achieved, and which are well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, what I claim as new and desire to secure by Letters Patent, is:

1. A mill of the character described, comprising an outer member of generally cylindrical shape, an inner member within said outer member eccentric with respect to said first member, means to cause relative rotation between said members, the inner member having a surface converging with respect to the inner surface of the outer member toward a point where the gap between the inner and outer members has its minimum width a circuitous passageway arranged within the inner member closely adjacent the outer curved surface thereof, means to introduce a heat exchange medium into the passageway, means to withdraw said heat exchange medium therefrom, and means to introduce material into the chamber formed between the inner and outer members, and means to withdraw said material from said chamber.

2. A mill of the character described, comprising an outer member of generally cylindrical shape, an inner member within said outer member eccentric with respect to said first member, means to cause relative rotation between said members, the inner member having a surface converging with respect to the inner surface of the outer member toward a point where the gap between the inner and outer members has its minimum width, means to introduce a heat exchange medium into the interior of the inner member, means to withdraw said heat exchange medium therefrom, means to introduce material into the chamber formed between the inner and outer members, near said point where the gap approaches its minimum width and directed toward the oncoming side of the outer member, means to withdraw said material from said chamber from the receding side of the outer member, means for varying the gap between the inner and outer members, means for measuring the temperature within said chamber, and means for measuring the pressure within said chamber.

3. An apparatus of the character described having an outer drum comprising a cylinder, detachable end walls and hollow shafts, and an eccentrically disposed inner substantially cylindrical drum having hollow shafts disposed within and in more or less coaxial alignment with said outer drum shafts, the inner diameter of said outer drum shafts being greater than the external diameter of said inner drum shafts, and means for adjusting the degree of eccentricity of said drums and hence the clearance between them, said means comprising an eccentric sleeve disposed between the hollow shafts of the two drums and means for axially rotating said sleeve to vary the axial relation between the shafts of both drums.

4. An apparatus of the class described comprising a support frame, a pair of spaced pillow blocks on said frame, bearings in said pillow blocks, a cylindrical rotor having axially outwardly extending hollow trunnions passing through said bearings, a power transmission pulley fixed on one of the trunnions, a cylindrical stator eccentrically disposed within said rotor, said stator having sleeves extending outwardly from its ends, said sleeves passing through the trunnions of the rotor, an enlarged longitudinal boss in said stator on the upper side thereof, the sleeves being eccentrically disposed relative to the stator cylinder but in substantially axial alignment with the said boss, spacing sleeves having an eccentric bore being interposed between the stator sleeves and the rotor trunnions, brackets on said support frame having openings through which the spacer sleeves extend, means to secure said spacer sleeves against rotation, a second cylinder surrounding the stator cylinder and concentrically spaced therefrom but having common end walls therewith forming between said cylinders a chamber, means to supply a heat exchange medium to said chamber and to withdraw said medium therefrom, said enlarged boss having two radial openings communicating with the chamber, one at each end thereof, annular baffle rings or partitions in said chamber, said baffles having an opening therethrough alternately positioned on diametrically opposite sides of the chamber in alternate baffles for imparting circuitous route to heat exchange medium passing through said chamber, conduit means to lead said medium to and from said chamber openings, and means to rotate the spacer sleeves to vary the gap between the rotor and the stator.

WILLEM J. KLAASSEN.

REFERENCES CITED

The following references are of record in the file of this patent:

UNITED STATES PATENTS

| Number | Name | Date |
|---|---|---|
| 33,405 | Smith | Oct. 1, 1861 |
| 566,672 | Dundee | Aug. 25, 1896 |
| 866,799 | Moulton | Sept. 24, 1907 |
| 926,441 | Shafter | June 29, 1909 |
| 1,603,639 | Reed | Oct. 19, 1926 |
| 1,679,093 | Miller | July 31, 1928 |
| 1,754,414 | Buchanan | Apr. 15, 1930 |
| 1,774,464 | Wood | Aug. 26, 1930 |
| 1,807,773 | Dawson | June 2, 1931 |
| 2,059,116 | Kiesskalt | Oct. 27, 1936 |

FOREIGN PATENTS

| Number | Country | Date |
|---|---|---|
| 440,266 | Germany | Feb. 2, 1927 |
| 25,193 | Sweden | Aug. 1, 1908 |